(United States Patent — Matsumura, 3,788,789, Jan. 29, 1974)

[54] APPARATUS FOR PRODUCING UNDRAWN POLYAMIDE FILMS HAVING UNIFORM PHYSICAL CHARACTERISTICS

[75] Inventor: Wakuo Matsumura, Osaka, Japan
[73] Assignee: Unitika Kabushiki Kaisha, Hyogo-ken, Japan
[22] Filed: Oct. 6, 1971
[21] Appl. No.: 187,058

Related U.S. Application Data
[63] Continuation-in-part of Ser. No. 809,255, March 21, 1969, abandoned.

[52] U.S. Cl. .................................. 425/230, 264/39
[51] Int. Cl. ................................................ B29d 7/00
[58] Field of Search .... 425/223, 230, 231; 164/158, 164/278; 264/39

[56] References Cited
UNITED STATES PATENTS

| | | | |
|---|---|---|---|
| 2,206,930 | 7/1940 | Webster | 164/278 X |
| 2,624,068 | 1/1953 | Dobry | 264/39 |
| 3,101,722 | 8/1963 | Merritt et al. | 425/224 X |

*Primary Examiner*—R. Spencer Annear
*Attorney, Agent, or Firm*—Wolder & Gross

[57] ABSTRACT

An improved process for producing undrawn polyamide films having uniform physical characteristics by preventing the formation of deposits of impurities on a formation surface. The molten film is extruded on a rotating roller surface where it is cooled and solidified and drawn off after the surface has traveled a distance substantially less than a whole revolution. There is then positioned a first liquid-removal means, polishing means, washing means, second liquid-removal means and drying means in that order in the direction of rotation of the roller when the surface is not in contact with the film. The polishing means may travel both horizontally across the entire width of the roller surface and vertically along a short portion of the roller surface in reciprocal motion to assist in removing the impurity deposits. The polishing means may be either a roller or shaped to conform to the roller surface and may also contain a suitable abrasive. In addition, the washing liquid may act as a polishing medium and may consist either of water or of an alcohol having one to 10 carbon atoms, or a mixture of both. The step of polishing the roller surface and in the presence of a suitable polishing medium allows significantly increase efficiency.

11 Claims, 2 Drawing Figures

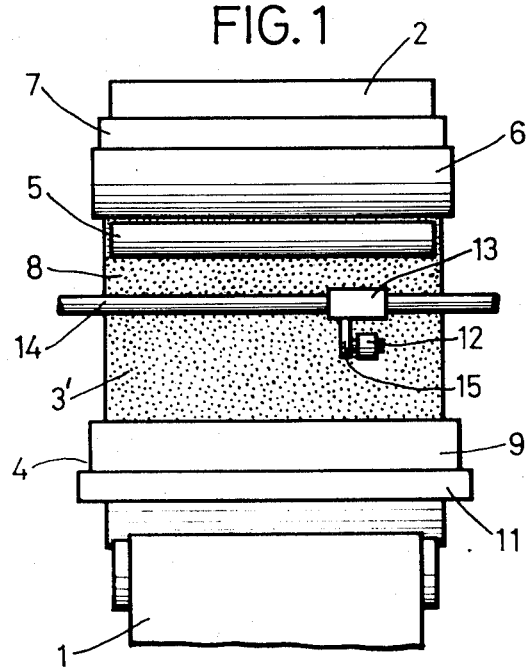
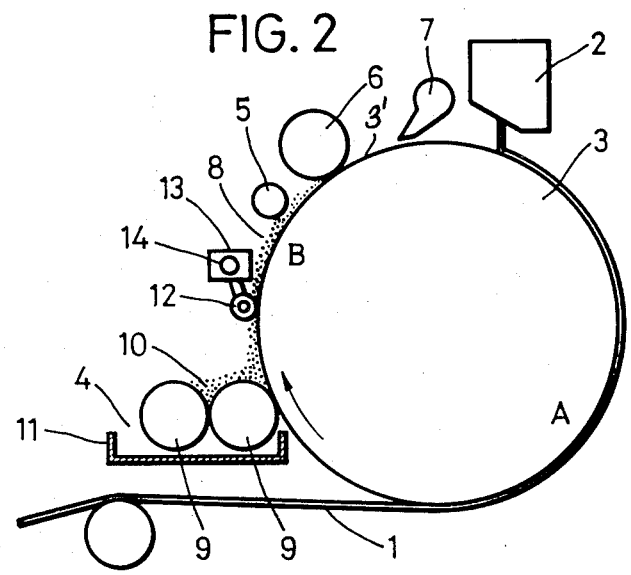

APPARATUS FOR PRODUCING UNDRAWN POLYAMIDE FILMS HAVING UNIFORM PHYSICAL CHARACTERISTICS

RELATED APPLICATIONS

This application is a continuation-in-part of Ser. No. 809,255, filed Mar. 21, 1969 now abandoned.

The present invention relates to a process and apparatus for producing resin films. More particularly, the present invention relates to a process and apparatus for cleaning a cooling roller for forming continuous resin films made, for example, of polyamide resin.

PRIOR ART

Conventional methods of continuous production of resin films involve melting and extruding a resin composition onto a cooling roller for rapid solidification. During the process, vapors of impurities such as monomers, oligomers, plasticizers and the like, condense between the extruded resin film in the molten state and the cooling roller, resulting in the accumulation and adherence of deposits of the undesired substance on the roller surface. Furthermore, such impurities in the film are transferred to the roller when the film is cooled by contact with the roller surface. The accumulated deposits on the surface of the cooling roller can deleteriously effect the extruded film production. Furthermore post-processing steps, such as drawing, become difficult. As a result, it is not easy to obtain a commercially useful product due to various non-uniform characteristics of the extruded resin film.

This well-known phenomena of the accumulation of deposits on the cooling roller surface occurs unexpectedly so that it is difficult to foresee its occurrence. Accordingly, it is sometimes necessary to use more than one cooling roller as replacements, or to carry out the production intermittently with down time for the cleaning of the roller surface.

With a view toward eliminating this phenomena and main-taining the surface conditions at a predetermined and constant state for continuous production of extruded resin films, I and others have disclosed in British Pat. Specification No. 1,244,702, and U.S. Pat. application Ser. No. 809,255, filed Mar. 21, 1969, a process and apparatus for producing resin films. The method comprises the steps of a molten resin composition continuously extruded as a film onto the surface of the cooling roller to effect rapid solidification followed by removal of the solidified film from the roller surface, the surface of the cooling roller being washed to remove deposited material and dried prior to recontact with further extruded resin film. It is possible to continuously produce undrawn films merely by washing and drying the surface of the cooling roller after removal of the solidified film and before recontact with further extruded resin film. But is has been found that after lengthy operation, unwashed material accumulates on the roller surface so that eventually a deposited layer of impurities is formed. It has also been found that in practice the use of expensive solvents in the washing liquid does not significantly increase the long term removal of the impurity deposits.

OBJECTS AND ADVANTAGES

Accordingly, among the principal objects of the present invention is to provide a new and improved process for cleaning a cooling roller surface for extended periods of time by polishing the surface.

Still another object of the present invention is to provide an improved process for cleaning a cooling roller surface by polishing the surface in the presence of a suitable polishing medium.

Still another object of the present invention is to provide apparatus which will accomplish the mechanical polishing of the surface.

Still yet another object of the present invention is to provide a process and apparatus for cleaning the surface of a cooling roller used for the continuous formation of a resin film less expensively and more efficiently than present methods.

Still yet another object of the present invention is to provide an apparatus for accomplishing the polishing of the cooling roller surface, said apparatus being inexpensive and simple to manufacture, and yet is durable to a high degree in use.

SUMMARY OF INVENTION

It has now unexpectedly been discovered that better results can be obtained by modifying said method in such a manner that the roller surface is mechanically polished by a solid material in the presence of a washing liquid used as polishing medium. In this manner, the undesired material is completely removed from the surface of the cooling roller after removal of the extruded resin film and before recontact with further extruded resin film.

In accordance with the present invention, I provide a process for cleaning the surface of a cooling roller for continuous formation of a resin film, whereby a molten resin composition is continuously extruded as a film onto the surface of the cooling roller for rapid solidification followed by removal of the solidified film from the roller surface, the surface of the cooling roller being washed and polished to remove the deposited material from the roller surface and thereafter dried prior to recontact with further extruded resin film, the polishing being effected in the presence of a washing liquid as a polishing medium.

It has been confirmed that in accordance with the process of the present invention the deposited material is substantially removed from the roller surface so that the surface conditions are kept at a predetermined and constant state prior to recontact with further extruded resin film, resulting in continuous production of the resin film for unexpectedly extended periods of time.

In this specification, the term of "a predetermined and constant state or conditions of the roller surface" denotes that immediately before recontact with further extruded resin film, the roller surface is completely cleaned and dried without any deposit and the entire surface is kept at a predetermined temperature.

In the process of the present invention, as the cooling roller rotates, it is contacted with extruded resin film which is then removed from the roller surface after solidification at an appropriate point, and the roller surface is then washed and polished. The surface is dried before the roller turns a full revolution to bring the surface back to the point when further extruded film is applied. The polishing is effected on or after washing in the presence of a washing liquid as polishing medium.

The washing, polishing and drying treatments can be controlled without difficulty to ensure that the surface of the cooling roller at the point of application of the extruded resin film is not only clean and dry, but is kept at a substantially constant temperature. Thus, fluctuations in the cooling of the extruded film can be avoided and this assists in obtaining a uniform product for unexpectedly extended periods.

Any and all polishing materials which are capable of removing the deposited material without deleterious effect upon the surface of the cooling roller and the extended resin film may be used for the purpose of the present invention. However, it is necessary to use a polishing material having an extremely fine corn grade in order to prevent any damage, such as the generation of wounds or scratches, on the roller surface due to the frictional movement.

When the polishing is done merely by using a polishing member, such as a polishing roller which is contacted with the surface of the cooling roller under pressure, it is difficult to obtain the desired results so that the non-uniformity of thickness and of surface property of the produced resin film will be eliminated. Thus, it is advantageous to use a polishing medium, and according to the present invention, the polishing is effected in the presence of a washing liquid used as a polishing medium.

The pressure on the polishing member may vary, depending upon various factors, such as the type of the resin composition, the type of the polishing material, the speed of the cooling roller in rotation and the like, but can easily be deduced, for example, by experiments.

It is preferable that the polishing member be put into reciprocal movement under predetermined conditions. For example, the polishing member moves from left to right and back reciprocally along its major axis which is in alignment with the major axis of the cooling roller within a specified distance with a constant speed. Also, it is possible to reciprocally move the polishing member in the direction of the rotation of the cooling roller and back, or other appropriate directions. Especially good results can be obtained by combining the reciprocal movements in both directions.

After the washing and polishing operations, the waste liquid containing the removed deposits and abrasive waste flows down the roller surface, and thus it is necessary to prevent the splashing of the waste liquid onto the solidified resin film. For this purpose, the waste liquid is preferably received in a receiver located under the polishing zone.

Because the washing liquid is also used as a polishing medium, the washing liquid, in addition to the ability of washing or dissolving the deposits, should not harm the polishing material. It is thus preferred to use, for example, water or an alcohol having one to 10 carbon atoms. It is also possible to use a mixture of water and alcohol. Examples of alcohols include aliphatic alcohols (e.g., methanol, ethanol), propanol, butanol, hexanol, pentanol, cyclohexanol, octanol, isomers thereof and aromatic alcohols such as benzyl alcohol. When water is used, it is advantageous to use it heated, e.g., to 40°C.

The remaining washing liquid is removed from the roller surface and it is dried, for example, by blowing cold or hot air onto it to keep the surface conditions at a predetermined and constant state.

According to the process of the present invention, it is possible to completely remove the deposited impurities from the surface before it is recontacted by further extruded resin film, the surface conditions being kept at a predetermined and constant state so that continuous production of the extruded resin film can be carried out without problems for unexpectedly extended periods.

In accordance with another aspect of the present invention, there is also provided an apparatus for carrying out the process of the present invention, comprising a rotatable roller which continuously receives an extruded resin film for rapid solidification by cooling at a specific location, the solidified film being removed from the surface of the cooling roller before the roller surface completes a full revolution to receive further extruded resin film at the aforementioned location; means for polishing the roller surface in the presence of a washing liquid which is also a polishing medium so that the roller surface is washed and polished to remove the deposited material; means for washing the roller surface on or before polishing; means for removing the washing liquid from the roller surface; further means for removing washing liquid and means for drying the roller surface before receipt of further extruded resin film.

The molten resin film material is extruded at a specific location onto a part of the surface of the cooling roller to effect rapid solidification, while said washing liquid removing means, polishing means, washing means, further washing liquid removing means and drying means are provided on another part of the surface of the cooling roller, preferably in the abovementioned sequence in the direction of the rotation of the cooling roller, so that the roller surface can be completely cleaned and dried after removal of the solidified film and before it is recontacted by further extruded resin film.

According to the present invention, the means for polishing the surface of the cooling roller comprise a polishing member supported by an arm of a carrier, which is in parallel alignment with the cooling roller surface, by means of a guide rail bridged over the entire width of the surface. The carrier is moved reciprocally from left to right and back, parallel to the surface of the cooling roller by a suitable driving means preferably having a substantially constant speed. The carrier arm has the polishing member secured to its end so that the polishing member is maintained in contact with the cooling roller surface under pressure and by suitable means. In one embodiment of the present invention, the arm reciprocates or vibrates with a substantially constant travel speed a relatively small distance in the circumferential direction, i.e., in the direction of the rotation of the cooling roller (being substantially vertical) and/or in the horizontal direction. Thus, it is possible to have the polishing member reciprocate simultaneously in both the horizontal and/or vertical directions.

The polishing member may be either in the form of a rotable roller or a non-rotatable body having a contacting surface shaped to conform with the cooling roller surface. The external layer of the polishing member consists of an abrasive such an inorganic abrasive, bonded, if desired, with a suitable bonding agent. The corn grade of the abrasive should be extremely fine in order to avoid the generation of wounds or scratches on the cooling roller surface from the frictional movement. Examples of suitable abrasives are SiC, $Al_2O_3$, boron oxide, steel wool, etc.

In the case of a rotatable roller, it is preferable that it rotates in a direction opposite to the rotation of the cooling roller, although it is also possible for both to rotate in the same direction.

The desired contacting pressure of the polishing member can easily be determined by experimentation, but in case of non-rotatable member the pressure may be within the range of from 2 to 10 kg/cm². This may vary, depending upon various factors which will be set forth.

The most advantageous result of the present invention of the cooling roller surface is the complete cleaning and drying so that the film production can be continued without difficulty over unexpectedly extended periods. Furthermore, the polishing effects can be uniformly distributed over the entire surface of the cooling roller without deformation or damage. In practice, it is not necessary to use a long polishing member since it may damage the cooling roller surface.

Additional objects and advantages of the present invention will become apparent from a consideration of the following detailed description when taken in conjunction with the accompanying drawings in which:

FIG. 1 is a schematic representation of a front elevational view of a preferred embodiment of the apparatus for carrying out the process of the present invention; and FIG. 2 is a schematic reproduction of the side elevational view of FIG. 1.

Referring in detail to the drawings and more particularly to FIG. 2, there is shown a molten resin composition being extruded from a film die having a die orifice 2 to form a film 1 which is rapidly solidified on the surface 3' of a cooling roller 3 which is generally plated on the surface. The film is then wound onto a take-up device (not shown). When the cooling roller surface is located at section A of the cooling roller circumference, it is in close contact with the film 1 for cooling, and another section B of the cooling roller 3, not in contact with the film, is provided in sequence in the direction of the rotation of the cooling roller 3 with the following: a waste liquid receiver 11; a first washing liquid removing device 4 for removal of the residual liquid; a polishing roller 12 supported by an arm 15 of a carrier 13, the carrier 13 being guided by a guide bar 14 bridged in parallel alignment to and over the entire length of the cooling roller surface 3'; a spraying device 5; a second device 6 for removing the remaining liquid; and a dryer 7.

The extruded film 1 is rapidly solidified by the cooling roller 3 and is then removed therefrom. The roller surface is then washed by means of the spraying device preferably in the form of a pipe having small radial holes therein. The spraying device 5 distributes the liquid down over the entire width of the roller surface. The washing liquid is also used as polishing medium, the surface of the cooling roller 3 being polished by means of a polishing roller 12.

In the illustrated embodiment, the polishing roller 12 rotates by a suitable rotating means (not shown) in a direction opposite to the rotation of the cooling roller 3. A guide bar 14 is bridged on and over the entire length of the cooling roller surface 3' in parallel alignment with the axis of the cooling roller 3. A carrier 13 is guided by the bar 14 so that the carrier 13 is put in reciprocal movement in the horizontal direction by suitable driving means (not shown). In this embodiment, the polishing roller 12 is located at the end of an arm 15 of the carrier. When polishing treatment is effected by means of the polishing roller which moves reciprocally in the horizontal direction, the cooling roller also rotates clockwise.

Since the waste washing liquid contains the abrasive waste and washed impurities, a liquid-removing device 4 is provided below the polishing roller 12 to prevent the liquid from splashing on the completed film.

The amount of the washing liquid depends upon the operational conditions, but it should preferably be sufficient so that the liquid is applied to the entire surface of the cooling roller 3 uniformly in order to wash out prior to the polishing treatment.

The washing liquid removal device 4 comprises a set of rollers 9 in contact with each other, one of them further contacted with the roller surface 3' so that both rollers rotate when the cooling roller 3 rotates. After the washing liquid has been used to wash and polish the surface of the cooling roller 3, the waste liquid is removed from the roller surface 3' by one of the set of rollers 9 in contact with the cooling roller 3, and is then led between the set of rollers 9. The washing liquid is directed to the contacting surface 10 and is then drained from either end of the set of rollers 9 which should be wider than the width of the film to be extruded, and the rollers 9 are preferably wider than the cooling roller 3. The washing liquid drains from either end of the set of rollers 9 because of the nips preventing the passage of the liquid between the rollers 9, and may be collected by means of a liquid receiver 11 provided below the set of rollers 9 in order to prevent the splashing onto the film.

Washing liquid which rises along the surface of the cooling roller 3 in the direction of the rotation of the cooling roller 3 may be removed by means of a second liquid-removal device 6.

The liquid-removal device 6 preferably comprises a roller which may contact the cooling roller 3 and is rotated by the rotation of the cooling roller 3. The liquid-removing device such as roller 6 should remove the washing liquid from the surface 3' of the cooling roller 3 without impairing the surface of the cooling roller 3.

When the liquid-removing device is a rotable body in contact with the cooling roller as shown in the drawing, it is preferably made of rubber. When the device 6 is in the form of a roller, the washing liquid which passes along the surface of the cooling roller 3 is prevented from passing further along the surface of the roller by virtue of the nip formed between the device 6 and the roller 3. In this case, the washing liquid 8 then builds up at the nip and subsequently falls under the action of gravity to be removed by roller 9. Washing liquid 8 which rises along the surface of the cooling roller 3 is at least partially removed by the device 6 which is in contact with the cooling roller 3, before the surface of the roller is subjected to the subsequent drying treatment.

The removal of the washing liquid from the surface of the cooling roller 3 should be such that any remaining liquid may be instantly dried off and the degree of removal may, for example, be controlled by adjusting the contact pressure of the cooling roller 3 and the liquid-removal devices 6 and 9. A dryer 7 is used for drying completely the surface of the cooling roller 3 after removal of the washing liquid. The entire width of the surface of the cooling roller 3 is dried uniformly by, for example, a stream of air prior to receiving further extruded resin film.

The drying system may be either a jet system with ducts or an aspirator. A jet system in which air is ejected from a narrow slit is to be preferred. The air jet of the dryer 7 should be of a temperature such that the cooling effect of the cooling roller is not substantially altered. A suitable air speed lies in the range of from 3 to 10 meters per second. The surface of the cooling roller so dried should then be in a predetermined and constant state ready for receipt of further extruded resin film, and resin films having uniform properties may with advantage be prepared by using such apparatus even with continuous and greatly extended operation.

Although the deposition and accumulation of the monomer and other impurities on the surface of the cooling roller may in general occur when thermoplastic resin composition is extruded and cooled by means of a cooling roller, the effect is particularly marked with films of synthetic linear polyamides such as e.g., poly-epsilon-caproamide, poly-hexamethylene adipamide, poly-11-amino undecanamide, poly-hexamethylene sebacamide, coolymerized polyamides thereof due to the strong hydrogen bonding and the neck-out difficulties inherent therein, and therefore polyamide films are used in the following non-limitative examples illustrating the invention.

EXAMPLE 1

Poly-epsilon-caproamide (relative viscosity of 3.06 measured at 25°C in 96% sulfuric acid) was extruded by using a 115 mm extruder provided with a film die to form a film (thickness -- 150 microns; width -- 640 mm) onto a cooling roller (diameter -- 900 mm; width -- 800 mm) for rapid solidification. The extruding speed was 20 m/min. The temperature on the surface of the cooling roller was kept at 35°C. In producing the film, the surface of the cooling roller was continuously washed with water and polished by using a polishing roller having the external layer made of a polyamide-type non-woven fabric coated with an SiC-type inorganic abrasive and bonded with synthetic resin (Tycrc Reinforced Wheel, Type 7 S-ULF, commercial product available from Sumitomo 3M K.K. Japan). The polishing roller had a diameter of 100 mm and a width of 24 mm and was put in contact with the surface of the cooling roller under a pressure of about 2,500 g/24 mm width. The cooling roller and the polishing roller rotated with the same spherical speed of 20 m/min. but the directions of rotation were opposite to each other. At the same time, the polishing roller was moved from left to right and back reciprocally along the axis of the cooling roller with a travel speed of 12 mm per one revolution of the cooling roller. The amount of water used for washing and polishing was about 7,000 – 7,500 cc/min. After the continuation of the production for 7-9 days without any other additional treatment such as wiping the surface of the cooling roller, minor changes (width -- about 2 mm; thickness -- about 2 microns or less) developed within the dimension of the produced film (these changes were measured at about 30 mm inside of the both edges of the film.

A comparative film was produced in a similar manner to that described above except polishing treatment. After the continuation of the production without any additional treatment for about 15 hours, significant dimensional changes (width -- 15 mm; thickness -- 12 microns) came on the comparative film.

EXAMPLE 2

A poly-epsilon-caproamide film was produced in an analogous manner to that described above with the exception that stainless steel wool (wire diameter -- 50 microns) having been compressed without bonding agent to form a plate-like body was used as polishing member. The plate (length -- 80 mm; width -- 50 mm; thickness -- 10 mm) has a space ratio of 50 percent. This plate was secured to an arm of a carrier so that the plate was contacted with the surface of the cooling roller under a pressure of about 6 kg/cm$^2$. The plate was moved reciprocally in the vertical direction within a distance of about 3 mm or less at a frequency of 60 Hz, and at the same time, the carrier was also moved reciprocally from left-hand side to right-hand side in the axial direction of the cooling roller with a travel speed of 25 mm per one revolution of the cooling roller by means of a guide bar bridged on and over the entire length of the cooling roller in parallel alignment to the cooling roller. The temperature of the water used for washing and polishing was 40°C. The surface conditions of the cooling roller were almost unchanged even after continuous production without any additional treatment for more than 7 days. Similar good results were observed when the contacting pressure was changed within the range of about 2 – 10 kg/cm$^2$.

EXAMPLE 3

A similar film to that described in Example 1 was produced in a similar manner to that described in Example 1 with the exception that the polishing roller (width -- 25 mm; diameter -- 100 mm) was rotated with a spherical speed of 60 m/min in the same direction as the rotation of the cooling roller. The polishing roller was provided with an external layer made of extremely fine grains of $Al_2O_3$ bonded with acetal-treated polyvinyl alcohol (PVA Polishing Stone, 1A 500 7M, commercial product available from Nippon Tokushu Toishi K.K., Japan). After continuous production for 7–9 days without any additional treatment, it was observed that the surface conditions of the cooling roller were almost unchanged.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An apparatus for cleaning the surface of a cooling roller for continuously forming a resin film having uniform physical characteristics which comprises:
    a. a rotatable cooling roller adapted for use continuously to receive an extruded resin film and to effect rapid solidification by cooling whereby the solidified film is removed from the roller surface before the cooling roller completes a full revolution to receive further extruded resin film;
    b. means for washing the surface of the cooling roller;
    c. means for polishing the surface of the cooling roller in the presence of washing liquid under constant pressure, said means being movable at least horizontally along the roller with constant speed;

d. first means for removing the washing liquid from the roller surface;
e. further means for removing the washing liquid;
f. means for receiving waste washing liquid; and
g. means for drying the roller surface, said means for receiving waste washing liquid, first means for removing washing liquid; means for polishing, means for washing, further means for removing the washing liquid and means for drying being positioned adjacent to and in sequence in the direction of the rotation of the cooling roller on a part of the cooling roller which is not in contact with the extruded resin film so that the surface of the cooling roller is cleaned and dried to be maintained at a predetermined and constant state after the removal of the extruded resin film and before receipt of further extruded resin film.

2. The invention according to claim 1, in which means for washing the roller surface comprises a spraying device which sprays washing liquid onto the entire surface of the cooling roller.

3. An apparatus for cleaning the surface of a cooling roller for continuously forming a resin film having uniform physical characteristics which comprises:
   a. a rotatable cooling roller adapted for use continuously to receive an extruded resin film and to effect rapid solidification by cooling whereby the solidified film is removed from the roller surface before the cooling roller completes a full revolution to receive further extruded resin film;
   b. means for washing the surface of the cooling roller;
   c. means for polishing the surface of the cooling roller in the presence of washing liquid under constant pressure, said means comprising a polishing member supported by an arm of a carrier which is brought in parallel relationship to the surface of the cooling roller by means of a guide rail bridge over the entire length of the cooling roller and being provided with an external layer of an abrasive, said carrier being reciprocally movable at least horozontally along the roller with a substantially constant speed, and said arm being provided with the polishing member at its end so that the polishing member is in contact with the surface of the cooling roller under constant pressure;
   d. first means for removing the washing liquid from the roller surface;
   e. further means for removing the washing liquid;
   f. means for receiving waste washing liquid; and
   g. means for drying the roller surface, said means for receiving waste washing liquid, first means for removing washing liquid; means for polishing, means for washing, further means for removing the washing liquid and means for drying being positioned adjacent to and in sequence in the direction of the rotation of the cooling roller on a part of the cooling roller which is not in contact with the extruded resin film so that the surface of the cooling roller is cleaned and dried to be maintained at a predetermined and constant state after the removal of the extruded resin film and before receipt of further extruded resin film.

4. The invention according to claim 3, in which the polishing member is provided with an external layer of an abrasive which does not harm the roller surface.

5. The invention according to claim 3, in which abrasive is Sic, $Al_2O_3$, boron oxide or steel wool.

6. The invention according to claim 3, in which the polishing member is a rotatable roller contacting with the surface of the cooling roller.

7. The invention according to claim 3, in which the polishing member is a non-rotatable polishing member having a contacting surface to fit with the surface of the cooling roller.

8. The invention according to claim 3, in which the arm is provided with a vibrating means so that the arm is reciprocally moved at least in one direction with a substantially constant speed.

9. An apparatus according to claim 8, in which the arm is reciprocally moved in the horizontal and/or vertical directions.

10. An apparatus according to claim 3, in which the first means for removing washing liquid comprises at least two devices.

11. An apparatus for cleaning the surface of a cooling roller for continuously forming a resin film having uniform physical characteristics, which comprises:
   a. a rotatable cooling roller adapted for use continuously to receive an extruded resin film and to effect rapid solidification by cooling whereby the solidified film is removed from the roller surface before the cooling roller completes a full revolution to receive further extruded resin film;
   b. a spraying device which sprays washing liquid onto the entire surface of the cooling roller;
   c. a polishing member which removes the deposited material from the surface of the cooling roller in the pressure of washing liquid under constant pressure; said member being supported by an arm of a carrier which is brought in parallel relationship to the surface of the cooling roller by means of a guide rail bridge over the entire length of the cooling roller and being provided with an external layer of an abrasive, said carrier being re-ciprocally movable at least horizontally along the roller with a substantially constant speed, and said arm being provided with the polishing member at its end so that the polishing member is in contact with the surface of the cooling roller under constant pressure;
   d. first means for removing the washing liquid from the roller surface, said means comprising at least two devices;
   e. further means for removing the washing liquid;
   f. means for receiving waste washing liquid; and
   g. means for drying the roller surface, said means for receiving waste washing liquid, first means for removing washing liquid; a polishing member, a spraying device, further means for removing the washing liquid and means for drying being positioned adjacent to and in sequence in the direction of the rotation of the cooling roller on a part of the cooling roller which is not in contact with the extruded resin film so that the surface of the cooling roller is cleaned and dried to be maintained at a predetermined and constant state after the removal of the extruded resin film and before receipt of further extruded resin film.

* * * * *